United States Patent [19]
Poole

[11] 4,126,330
[45] Nov. 21, 1978

[54] ANTI-THEFT DEVICE FOR TRACTOR-TRAILER RIG

[76] Inventor: William H. Poole, 1200 S. Willow, Chattanooga, Tenn. 37404

[21] Appl. No.: 815,901

[22] Filed: Jul. 15, 1977

[51] Int. Cl.² .............................................. B60D 1/00
[52] U.S. Cl. ..................................... 280/474; 70/237
[58] Field of Search ................... 280/474, 460 R, 445, 280/507, 432, 408, 423 R, DIG. 14; 180/114; 70/237

[56] References Cited

U.S. PATENT DOCUMENTS

| | | | |
|---|---|---|---|
| 3,421,777 | 1/1969 | Barker | 280/474 X |
| 3,612,575 | 10/1971 | Stewart | 280/474 |
| 3,633,039 | 5/1972 | Morgan | 280/474 X |

Primary Examiner—John A. Pekar
Attorney, Agent, or Firm—Lamont Johnston

[57] ABSTRACT

Each of a pair of housings is affixed to a corresponding side surface of a trailer and terminates at an open end at a forward surface of the trailer. Each of a pair of rigid elongated locking bars is retractably slidably mounted in a corresponding one of the housings and each is anchored at its first end in its housing. In retracted position, the locking bars are in the housings and extend to the forward surface of the trailer at their second ends. In extended position, the locking bars extend out of the housings for most of their lengths beyond the forward surface of the trailer to operative proximity with a rearward surface of the tractor in spaced parallel relation. Eyes are affixed to the rearward surface of the trailer. Each of a pair of padlocks releasably secures a corresponding one of the locking bars at its second end to an eye when the locking bars are in their extended positions thereby preventing the turning of the trailer relative to the tractor to prevent the turning of the tractor and trailer rig around corners and thereby discouraging theft of the rig.

6 Claims, 6 Drawing Figures

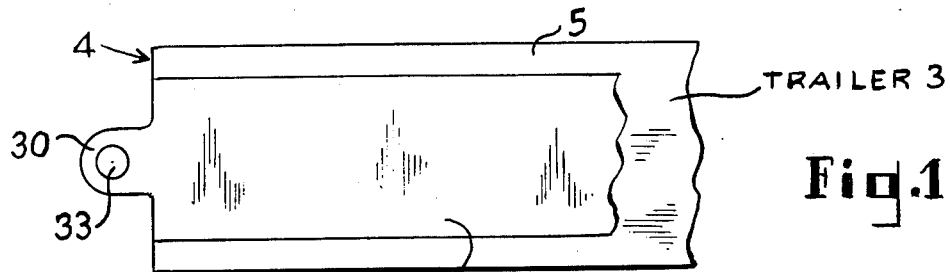
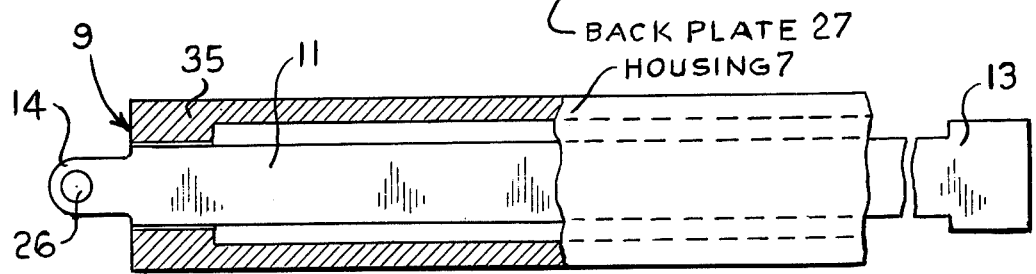
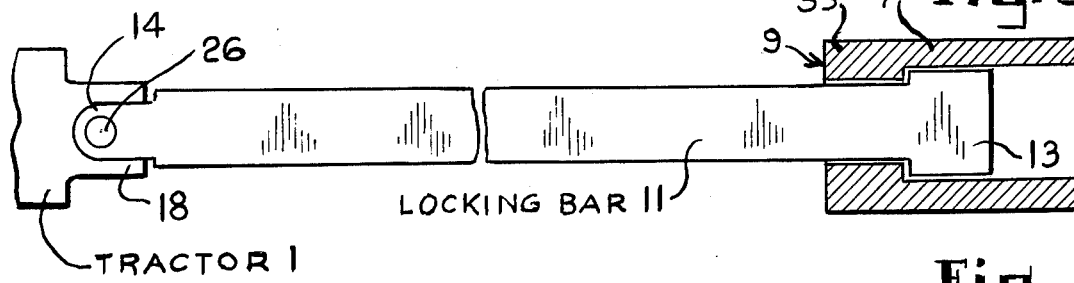
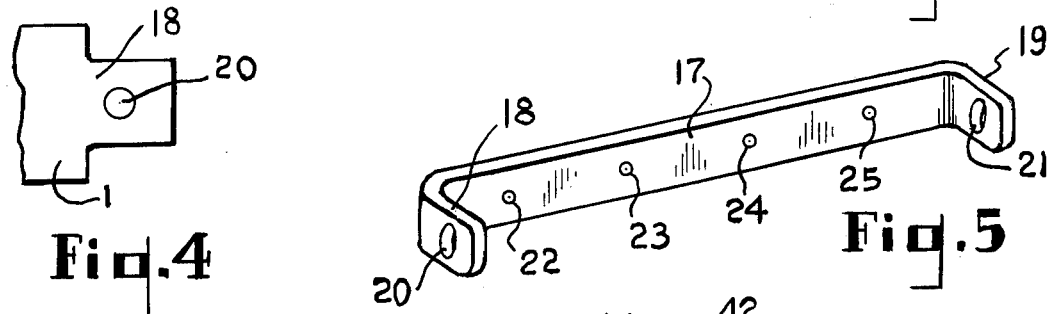
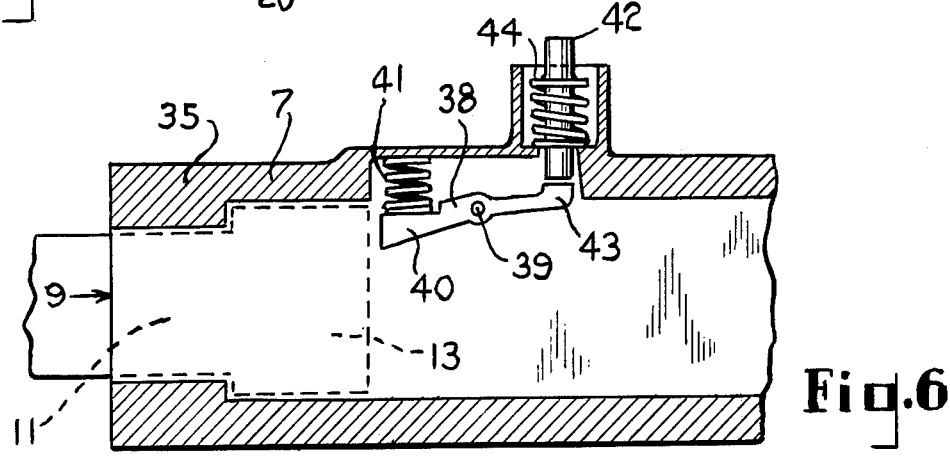

ANTI-THEFT DEVICE FOR TRACTOR-TRAILER RIG

BACKGROUND OF THE INVENTION

The present invention relates to an anti-theft device for a tractor-trailer rig. More particularly, the invention relates to an anti-theft device for a tractor-trailer rig having a tractor with a rearward surface facing rearward and a trailer with a forward surface facing forward and spaced parallel side surfaces.

Tractor-trailer rigs are subject to theft, as are most items in today's society. Devices for preventing the theft of tractor-trailer rigs are relatively complicated and expensive in manufacture and installation. There is thus a need for a device which is inexpensive in manufacture and installation and which is relatively simple in structure and may be installed with facility, and which functions to discourage the theft of a tractor-trailer rig.

The principal object of the invention is to provide an anti-theft device for a tractor-trailer rig, which anti-theft device is installable with facility and convenience on new and existing tractor-trailer rigs.

An object of the invention is to provide an anti-theft device for a tractor-trailer rig, which anti-theft device is usable with facility, convenience and rapidity.

Another object of the invention is to provide an anti-theft device for a tractor-trailer rig, which device is of simple structure and is inexpensive in manufacture and installation.

Still another object of the invention is to provide an anti-theft device for a tractor-trailer rig, which device efficiently prevents the turning of a trailer affixed to a tractor relative to such tractor thereby discouraging theft of the rig.

BRIEF SUMMARY OF THE INVENTION

In accordance with the invention, an anti-theft device for a tractor-trailer rig, said tractor-trailer rig having a tractor with a rearward surface facing rearward and a trailer with a forward surface facing forward and spaced substantially parallel side surfaces, comprises a pair of housings, each affixed to a corresponding side surface of the trailer and terminating at an open end at the forward surface of the trailer. A pair of rigid substantially elongated locking bars each having spaced opposite first and second ends. Each of the locking bars is retractably slidably mounted in a corresponding one of the housings and each is anchored at its first end in its housing in a manner whereby in retracted position the locking bars are in the housings and extend substantially to the forward surface of the trailer at their second ends and in extended position the locking bars extend out of the housings for most of their lengths beyond the forward surface of the trailer to operative proximity with the rearward surface of the tractor in spaced substantially parallel relation. An eye device is affixed to the rearward surface of the tractor. A pair of padlocks, each releasably secures a corresponding one of the locking bars at its second end to the eye device when the locking bars are in their extended positions thereby preventing the turning of the trailer relative to the tractor to prevent the turning of the tractor and trailer rig around corners and thereby discouraging theft of the rig.

Each of the locking bars has a hole formed therethrough at its second end for accommodating a padlock.

The eye device comprises an elongated bracket bar having spaced opposite first and second ends. Each end of the eye device is bent at substantially right angles to the remainder of the bracket bar and each end has a hole formed therethrough for accommodating a padlock. The bracket bar is affixed to the rearward surface of the tractor with the ends thereof extending toward the trailer substantially perpendicularly to the rearward surface.

Each of a pair of back plates is interposed between a corresponding one of the side surfaces of the trailer and a corresponding one of the housings and affixed thereto. Each of the back plates has spaced opposite first and second ends and is positioned with its first end spaced from the forward surface of the trailer and with its second end extending beyond the forward surface and having a hole formed therethrough for accommodating a padlock whereby the locking bars are releasably securable in their retracted positions to the corresponding back plates.

Each of the housings has spaced opposite first and second ends substantially coincident with the first and second ends of the backing plates and the first and second ends of the locking bars in their retracted positions. Each of the housings has a stepped down narrowed second end at its opening and in the area of its opening. Each of the locking bars has a stepped up widened first end whereby when the locking bars are in their extended positions their first ends abut the second ends of the corresponding housings thereby anchoring the locking bars in said housings.

Each of a pair of manually-releasable spring-biased latch members is mounted in a corresponding one of the housings in the area of the second end of each of the housings for releasably maintaining the corresponding locking bars in extended position.

BRIEF DESCRIPTION OF THE DRAWINGS

In order that the invention may be readily carried into effect, it will now be described with reference to the accompanying drawings, wherein:

FIG. 1 is a view of an embodiment of a back plate of a housing of the anti-theft device of the invention;

FIG. 2 is a view, partly cutaway and partly in section, of an embodiment of a housing and a locking bar thereof of the anti-theft device of the invention, with the locking bar in its retracted position;

FIG. 3 is a view, partly in section, of the embodiment of FIG. 2, with the locking bar in its extended position;

FIG. 4 is an end view of an embodiment of an eye device of the anti-theft device of the invention;

FIG. 5 is a perspective view, on a reduced scale, of the embodiment of the eye device of FIG. 4;

FIG. 6 is a view, on an enlarged scale, partly in section, illustrating an embodiment of a latch member of the anti-theft device of the invention.

DETAILED DESCRIPTION OF THE INVENTION

Figure 7:
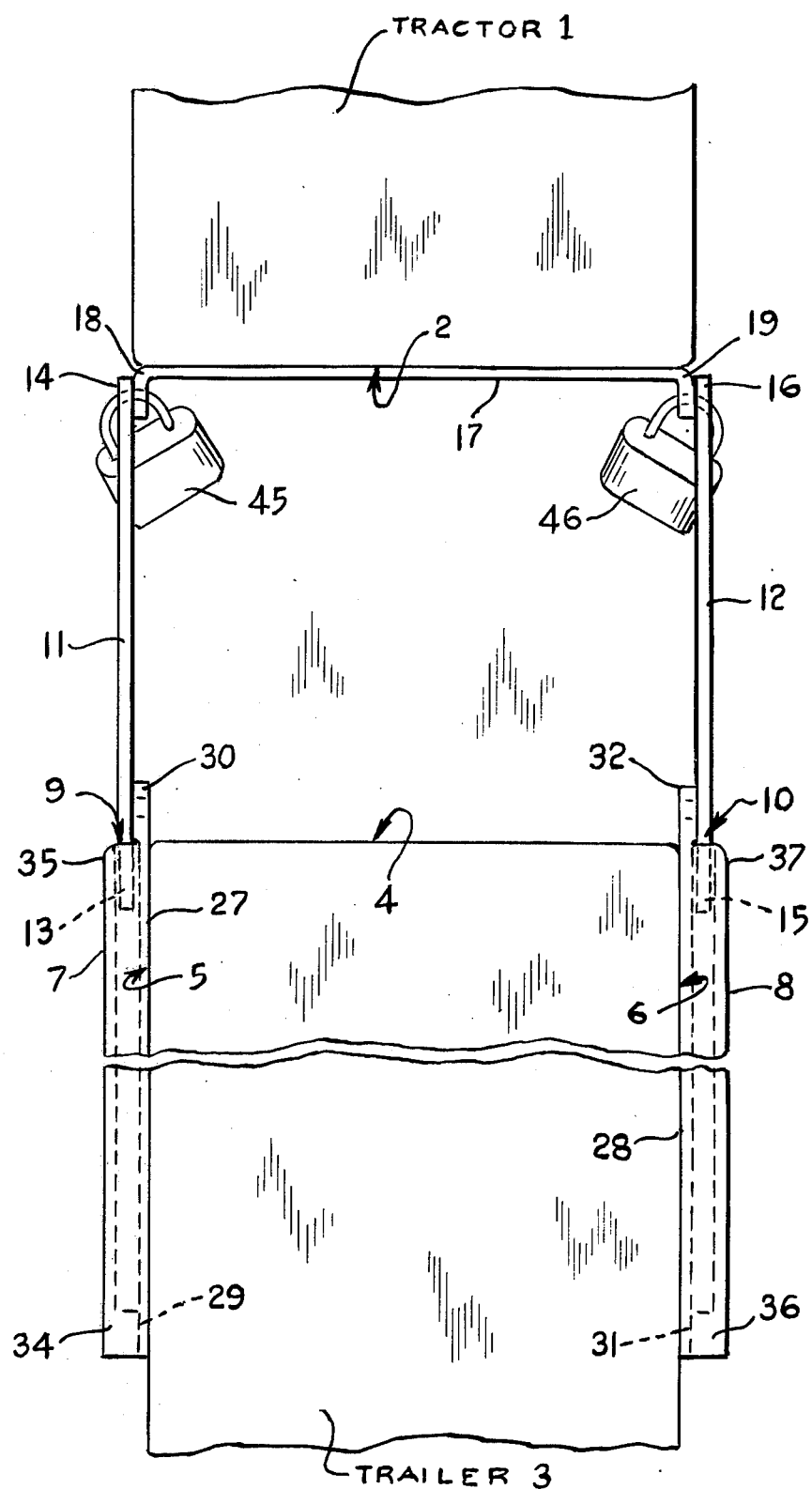
FIG. 7 is a top plan view of the anti-theft device of the invention in use securing a trailer to a tractor in a manner which prevents relative turning thereof.

The anti-theft device of the invention is for a tractor-trailer rig having a tractor 1 with a rearward surface 2 facing rearward and a trailer 3 with a forward surface 4 facing forward, as shown in FIG. 7. The trailer 3 has spaced substantially parallel side surfaces 5 and 6 (FIG. 7).

The anti-theft device of the invention comprises a pair of housings 7 and 8, respectively. The housing 7 is affixed to the side surface 5 of the trailer 3 and terminates at an open end 9 at the forward surface 4 of the trailer. The housing 8 is affixed to the side surface 6 of the trailer 3 and terminates at an open end 10 at the forward surface 4 of said trailer, as shown in FIG. 7.

A pair of rigid, substantially elongated, locking bars 11 and 12 are provided, as shown in FIG. 7. The locking bar 11 has spaced opposite first and second ends 13 and 14, respectively, and the locking bar 12 has spaced opposite first and second ends 15 and 16, respectively (FIG. 7).

The locking bar 11 (FIGS. 2, 3, 6 and 7) is retractably slidably mounted in the housing 7 and is anchored at its first end 13 in said housing in a manner whereby in retracted position, as shown in FIG. 2, said locking bar is in said housing and extends substantially to the forward surface 4 of the trailer 3 at its second end 14. In extended position, as shown in FIGS. 3, 6 and 7, the locking bar 11 extends out of the housing 7 for most of its length, beyond the forward surface 4 of the trailer 3 to operative proximity with the rearward surface 2 of the tractor 1.

The locking bar 12 (FIG. 7) is retractably slidably mounted in the housing 8 and is anchored at its first end 15 in said housing in a manner whereby in retracted position (not shown in the FIGS.) said locking bar is in said housing and extends substantially to the forward surface 4 of the trailer 3 at its second end 16. In extended position, the locking bar 12 extends out of the housing 8 for most of its length, beyond the forward surface 4 of the trailer 3, to operative proximity with the rearward surface 2 of the tractor 1 in spaced substantially parallel relation with the locking bar 11, as shown in FIG. 7.

Eyes are affixed to the rearward surface 2 of the tractor 1. The eyes may be separate and independent from each other, in which case they are affixed to the tractor 1 and extend therefrom in spaced substantially parallel relation. In the preferred embodiment of the invention, an eye device comprises, as shown in FIGS. 5 and 7, an elongated bracket bar 17 having spaced opposite first and second ends 18 and 19, respectively (FIGS. 5 and 7). Each of the ends 18 and 19 of the bracket bar 17 is bent at substantially right angles to the remainder of the bracket bar and each end has a hole formed therethrough for accommodating a padlock. Thus, as shown in FIG. 5, the end 18 of the bracket bar 17 has a hole 20 formed therethrough and the end 19 of said bracket bar has a hole 21 formed therethrough.

As shown in FIG. 7, the bracket bar 17 is affixed to the rearward surface 2 of the tractor 1 with the ends 18 and 19 thereof extending toward the trailer 3 substantially perpendicularly to said rearward surface. As shown in FIG. 5, the bracket bar 17 may have a plurality of spaced holes 22, 23, 24 and 25 formed therethrough for facilitating the affixing of the eye device to the tractor 1 via rivets, or the like. The bracket bar of the eye device is preferably welded to the tractor 1, however.

Each of the locking bars 11 and 12 has a hole formed therethrough at its second end 14 and 16, respectively, for accommodating a padlock. Thus, as shown in FIGS. 2 and 3, the locking bar 11 has a hole 26 formed therethrough at its second end 14.

A pair of back plates 27 and 28 (FIG. 7) are provided. As shown in FIG. 7, the back plate 27 is interposed between the side surface 5 of the trailer 3 and the housing 7 and affixed thereto. The back plate 28 is interposed between the side surface 6 of the trailer 3 of the housing 8 and affixed thereto (FIG. 7). The back plate 27 has spaced opposite first and second ends 29 and 30, respectively, and the back plate 28 has first and second ends 31 and 32, respectively, as shown in FIG. 3.

The back plates 27 and 28 are positioned with their first ends 29 and 31, respectively, spaced from the forward surface 4 of the trailer 3 and with their second ends 30 and 32, respectively, extending beyond said forward surface, as shown in FIG. 7. A hole is formed through the second end 30 and 32 of each of the back plates 27 and 28, respectively, for accommodating a padlock whereby the locking bars 11 and 12 are releasably securable in their retracted positions to the corresponding back plates 27 and 28, respectively. The back plate 27 thus has a hole 33 formed therethrough at its second end 30, as shown in FIG. 1.

The housing 7 has spaced opposite first and second ends 34 and 35, respectively (FIG. 7), substantially coincident with the first and second ends 29 and 30 of the backing plate 27 and the first and second ends 13 and 14 of the locking bar 11 in its retracted position. The housing 8 has spaced opposite first and second ends 36 and 37, respectively (FIG. 7), substantially coincident with the first and second ends 31 and 32 of the backing plate 28 and the first and second ends 15 and 16 of the locking bar 12 in its retracted position.

Each of the housings 7 and 8 has a stepped down narrowed second end at its opening 9 and 10, respectively, and in the area of its opening, as illustrated for the housing 7 in FIGS. 2, 3 and 6. Each of the locking bars 11 and 12 has a stepped up widened first end whereby when the locking bars are in their extended positions, as shown in FIG. 7, their first ends abut the second ends of the corresponding housings thereby anchoring said locking bars in said housings. Thus, as shown in FIGS. 2, 3 and 6, the locking bar 11 has a stepped up widened first end 13 and when said locking bar is in its extended position, shown in FIGS. 3 and 6, said first end abuts the second end 35 of the corresponding housing 7 thereby anchoring said locking bar in said housing.

A pair of manually-releasable spring-biased latch members are provided, each mounted in a corresponding one of the housings 7 and 8 in the area of the second end 35 and 37, respectively, of the housings for releasably maintaining the corresponding locking bar 11 and 12, respectively, in extended position. Thus, as shown in FIG. 6, a manually-releasable spring-biased latch member 38 is mounted in the housing 7 in the area of the second end 35 of said housing for releasably maintaining the locking bar 11 in extended position. The latch member 38 is pivotally mounted in the area of its center 39 and is biased at one end 40 by a spring 41 interposed between said end and the housing 7, which urges said end away from said housing, as shown in FIG. 6, so that said latch member obstructs the movement back into the housing of the locking bar 11. A spring-biased push button 42 abuts the opposite other end 43 of the latch member 38, so that when it is manually depressed, it rotates said latch member clockwise about its center, thereby moving the end 40 of said latch member toward the housing and out of the path of the locking bar 11. The push button 42 is biased by a spring 44 which urges it outward or upward, after it is released from manual pressure.

A pair of padlocks 45 and 46, of heavy type (FIG. 7) releasably secure the locking bar 11 at its second end 14 and the locking bar 12 at its second end 16, respectively, to the eye device 17, 18, 19 when said locking bars are in their extended positions, as shown in FIG. 7. This prevents the turning of the trailer 3 relative to the tractor 1 to prevent the turning of the tractor and trailer rig around corners and thereby discourages theft of the rig.

While the invention has been described by means of a specific example and in a specific embodiment, I do not wish to be limited thereto, for obvious modifications will occur to those skilled in the art without departing from the spirit and scope of the invention.

I claim:

1. An anti-theft device for a tractor-trailer rig, said tractor-trailer rig having a tractor with a rearward surface facing rearward and a trailer with a forward surface facing forward and spaced substantially parallel side surfaces, said anti-theft device comprising
    a pair of housings, each affixed to a corresponding side surface of the trailer and terminating at an open end at the forward surface of said trailer;
    a pair of rigid substantially elongated locking bars, each having spaced opposite first and second ends and each retractably slidably mounted in a corresponding one of the housings in a manner whereby in retracted position the locking bars are in the housings and extend substantially to the forward surface of the trailer at their second ends and in extended position said locking bars extend out of said housings for most of their lengths beyond the forward surface of said trailer to operative proximity with the rearward surface of said tractor in spaced substantially parallel relation;
    anchoring means formed in each of the housings in the area of the open end thereof and in each of the locking bars in the area of the first end thereof and cooperating to prevent said locking bars from being removed from said housings;
    locking means in each of said housings for releasably locking said locking bars in extended position;
    eye means affixed to the rearward surface of the tractor; and
    a pair of padlocks, each releasably securing a corresponding one of the locking bars at its second end to the eye means when said locking bars are in their extended positions thereby preventing the turning of the trailer relative to the tractor to prevent the turning of the tractor and trailer rig around corners and thereby discouraging theft of the rig.

2. An anti-theft device for a tractor-trailer rig as claimed in claim 1, wherein each of the locking bars has a hole formed therethrough at its second end for accommodating a padlock.

3. An anti-theft device for a tractor-trailer rig as claimed in claim 1, wherein the eye means comprises an elongated bracket bar having spaced opposite first and second ends, each end of which is bent at substantially right angles to the remainder of the bracket bar and each end of which has a hole formed therethrough for accommodating a padlock, said bracket bar being affixed to the rearward surface of the tractor with the ends thereof extending toward the trailer substantially perpendicularly to said rearward surface.

4. An anti-theft device for a tractor-trailer rig as claimed in claim 1, further comprising a pair of back plates, each interposed between a corresponding one of the side surfaces of the trailer and a corresponding one of the housings and affixed thereto, each of the back plates having spaced opposite first and second ends and being positioned with its first end spaced from the forward surface of the trailer and with its second end extending beyond said forward surface and having a hole formed therethrough for accommodating a padlock locking each locking bar to its corresponding back plate via the holes thereof whereby the locking bars are releasably securable in their retracted positions to the corresponding back plates.

5. An anti-theft device for a tractor-trailer rig as claimed in claim 4, wherein each of the housings has spaced opposite first and second ends substantially coincident with the first and second ends of the backing plates and the first and second ends of the locking bars in their retracted positions, each of said housings having a stepped down narrowed second end at its opening and in the area of its opening and each of said locking bars having a stepped up widened first end whereby when the locking bars are in their extended positions their first ends abut the second ends of the corresponding housings thereby anchoring said locking bars in said housings.

6. An anti-theft device for a tractor-trailer rig as claimed in claim 5, wherein the locking means comprises a pair of manually-releasable spring-biased latch members, each mounted in a corresponding one of the housings in the area of the second end of each of said housings for releasably maintaining the corresponding locking bars in extended position.

* * * * *